April 18, 1933.  R. J. KISSINGER  1,904,620
BATTERY SUPPORT
Filed Jan. 22, 1932
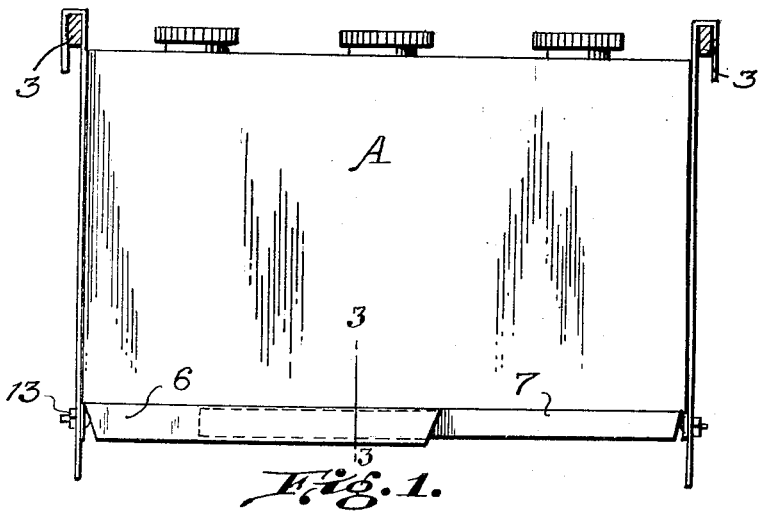
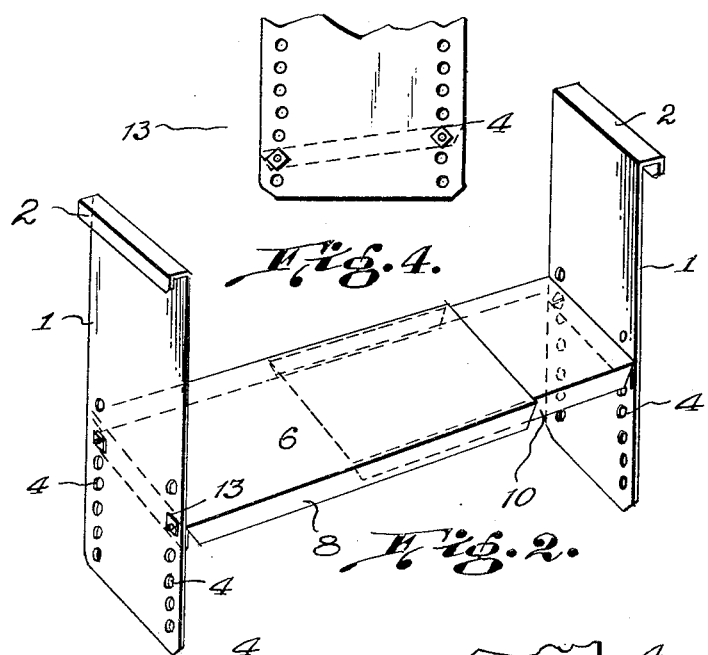
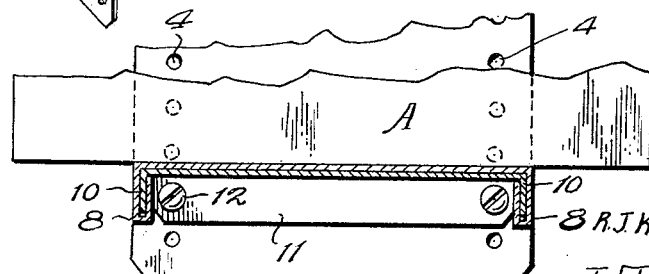
INVENTOR:
R. J. Kissinger
J. T. Newton
ATTORNEYS.

Patented Apr. 18, 1933

1,904,620

UNITED STATES PATENT OFFICE

RAYMOND J. KISSINGER, OF FORT MYERS, FLORIDA

BATTERY SUPPORT

Application filed January 22, 1932. Serial No. 588,182.

My invention relates to battery supports and, while it is well adapted to support the original battery in position, it is especially adapted for replacement purposes or in repair jobs where the original support for the battery has been corroded and weakened.

In repair jobs the support must ordinarily be adapted for various sized batteries inclined at various angles to fit in with particular constructions and one object of my invention, therefore, is to provide a battery support that will fit different constructions of batteries and a feature of my support is that it may be adjusted in three ways.

Another object of the invention is to produce a strong support that may be manufactured at a minimum cost and by an ordinary mechanic with few tools and out of sheet iron.

With these and other objects in view which will be apparent as the description proceeds, and in order that the invention may be fully understood, reference will be made to the accompanying drawing in which:

Fig. 1 is an elevation of a battery supported by my support.

Fig. 2 is a perspective view of the support without the battery.

Fig. 3 is a section on the line 3—3 of Fig. 1, and

Fig. 4 is a view showing how the base in the support may be held in inclined position.

A represents a conventional battery, usually a storage battery for an automobile or other vehicle. These batteries are usually supported in some convenient place on the vehicle and my supports conveniently comprise end uprights 1—1 having hooks 2—2 at their upper ends which may be hooked over some portion 3—3 of the battery frame on the vehicle.

Down either side of the supports are parallel rows of holes 4—4 and between the uprights 1—1 is an extensible base made up of two parts 6 and 7. The part 6 may be provided with a downturned trough-like flange 8 conveniently formed by bending down, then horizontally, then upwardly its edges.

The base part 7 also has downturned edge flanges 10—10. These flanges fit into the trough-like flanges 8—8, as shown best in Fig. 3. At one end of both base parts 6 and 7 there is a turned-down flange 11 having at either end holes that may be brought into register with the holes 4—4 in the uprights 1—1 and I conveniently pass screw-headed bolts 12 through these holes and attach nuts 13 thereto.

By this construction, it is apparent that the base portion 6 may be attached, as shown, to one of the uprights 1 and the other base portion 7 attached to the other upright 1 and the flanges 10 on the part 7 may be telescoped into the trough-like flanges 8 on the part 6 and these parts moved together or separated to fit batteries of different lengths.

In order to accommodate batteries of different heights and/or depths, it is only necessary to take out the bolts 12 and move them from one hole 4 to the other to raise or lower the base portions 6 and 7 to fit any height and/or depth battery within the ordinary limits. The holes are sufficiently larger than the bolts so that in case the support 3 over which the hooks 2 extend is inclined, the base portions 6 and 7 may be inclined as shown in Fig. 4, for the purpose of adjustment to meet the angle of the battery frames on some vehicles.

By reason of the flanges 10 fitting in the trough-like flanges 8, the meeting ends of the supports 6 and 7 are held from sagging and even when the uprights 1—1 are separated, as shown in Fig. 2, the meeting ends of the supports are held from sagging. Of course, uprights 1—1 are not pushed so far apart as to endanger the dropping out of the battery.

By inclining the bottom supports 6—7, as shown in Fig. 4, the battery may be held level even though the support 3 over which the uprights hook, is inclined.

By reason of the slopping over of the acids in the batteries, the deterioration of battery supports is extensive and consequent repair is frequent. With my supports that can be adjusted to fit batteries of different lengths, different heights and/or depths and on supports differently inclined, an inexperienced person may easily fit almost any modern battery to its particular frame on a vehicle, by use of this device.

Having described my invention and its mode of operation, what I claim as new is:

1. A battery support comprising two upright end portions having hooks at their upper ends adapted to hook over a portion of a vehicle and a plurality of rows of holes near the vertical edges of the two uprights, an extensible base support for the battery having telescoping meeting ends between the uprights and bolts adjustable in the rows of holes to incline the extensible base at different horizontal angles whereby the extensible base portions may be kept horizontal when the support on the vehicle cooperating with the hooks is inclined.

2. A battery support comprising two end uprights having a plurality of rows of holes therein and having permanent hooks at their upper ends adapted to hook over a part of a vehicle, telescoping base supports between the uprights each having a flanged end with holes therein, one of the telescoping parts including a trough-like flange and the other telescoping part having a flange extending into said trough-like flange, and means to rigidly attach the flanged ends of the telescoping parts to the upright supports and to rigidly hold such parts at various angles.

3. A battery support comprising two upright ends having means for attaching them to a part of a vehicle, a two part extensible base for the battery between the upright ends of substantially the same width as said ends, said base including telescoping parts including a trough like part on one of said telescoping parts and a turned down flange fitting therein on the other telescoping part whereby the support may accommodate batteries of different lengths, nut and bolt connections between the extensible parts and the upright ends adjustable to permit the extensible parts to be moved bodily up or down to accommodate batteries of different heights and/or depths and also to be inclined in a horizontal direction and rigidly attaching the telescoping parts to the upright ends.

4. A battery support comprising two upright ends and two intermediate metal sheets all substantially the same width, the two upright end sheets having hooks at their upper ends and each upright end sheet having a double row of holes, the two intermediate sheets having turned down flanges at their outer ends with holes at either end of each flange and bolts and nuts to clamp said flanges to said upright end sheets, the intermediate sheets having flanges at their interior side portions to form telescoping joints that will prevent sagging whereby the upright end pieces may be hooked over the parts of an automobile frame and the intermediate sheets may be held either in horizontal or inclined positions relative to the upright end pieces and the telescoping ends of the intermediate sheets allow adjustments for different size batteries.

In testimony whereof I affix my signature.

RAYMOND J. KISSINGER.